United States Patent Office 3,707,571
Patented Dec. 26, 1972

3,707,571
HALOGENATION OF POLYCYCLIC
PERHYDROAROMATICS
Abraham Schneider, Overbrook Hills, Pa., assignor to
Sun Oil Company, Philadelphia, Pa.
No Drawing. Continuation-in-part of application Ser. No. 702,789, Feb. 5, 1968. This application Dec. 19, 1969, Ser. No. 886,796
The portion of the term of the patent subsequent to Dec. 23, 1986, has been disclaimed
Int. Cl. C07c 17/10, 23/20
U.S. Cl. 260—648 R                    12 Claims

ABSTRACT OF THE DISCLOSURE

Polycyclic perhydroaromatics having 3–11 rings at least two of which are fused are mono- and dihalogenated by reacting the same under homogeneous conditions and at −30° C. to 20° C. with a $C_4$–$C_5$ tertiary alkyl chloride or bromide, using as catalyst dissolved $AlCl_3$ or $AlBr_3$, and then recovering product containing both one and two chlorine or bromine atoms attached to ring carbon atoms. The monohalo and dihalo products can be used to alkylate benzene and yield polycyclic hydrocarbons of low aromaticity useful as traction fluid components or useful for further conversion to sulfonates suitable as detergent components of lubricating oil compositions.

CROSS REFERENCE TO RELATED APPLICATIONS

This application is a continuation-in-part of my copending application Ser. No. 702,789, filed Feb. 5, 1968, now Pat. No. 3,485,880, issued Dec. 23, 1969 which discloses and claims a process for polychlorinating or polybrominating $C_{10}$–$C_{20}$ adamantane hydrocarbons at bridgehead positions in the adamantane nucleus. The procedure involves reaction of the feed hydrocarbon under homogeneous conditions with a $C_4$–$C_5$ tertiary alkyl chloride or bromide, using as catalyst dissolved $AlCl_3$ or $AlBr_3$. The present process utilizes a similar procedure for halogenating polycyclic fused ring perhydroaromatic hydrocarbons.

My copending application Ser. No. 883,579, filed Dec. 9, 1969, involves a similar procedure for the dihalogenation of alkylcyclohexanes; my copending application Ser. No. 883,580, filed Dec. 9, 1969, involves an analogous procedure for the dihalogenation of certain types of branched alkanes; and my copending applications Ser. No. 886,797, filed Dec. 19, 1969 and Ser. No. 887,377, filed Dec. 22, 1969, likewise involve the utilization of a similar procedure for the dihalogenation of alkyldecahydronaphthalenes and perhydropolyphenyl hydrocarbons, respectively.

BACKGROUND OF THE INVENTION

This invention relates to the conversion of polycyclic perhydroaromatics having 3–11 rings at least two of which are fused into mono- and dihalogenated derivatives in which the halogen is chlorine or bromine. The halogenating agent is a $C_4$–$C_5$ tertiary alkyl chloride or bromide. The products are monochloro and dichloro, or monobromo and dibromo, perhydroaromatics having the same number of carbon atoms and rings as the starting material and containing the halogen atoms as ring substituents. These products have utility as intermediates for preparing traction fluid components or for preparing sulfonate detergents useful as components in lubricating oil compositions, as discussed hereinafter.

Hydrogen-halogen exchange reactions between a tertiary alkyl halide, such as t-butyl chloride, and various hydrocarbons containing one or more tertiary hydrogen atoms have been described in the prior art. A process involving this reaction has been described, for example, by C. W. Kruse, Preprints, ACS Pet. Div., vol. 12, No. 2, Advances in Petrochemical Symposium, Miami Beach, Fla. (April 1967). In the described process an aluminum chloride complex was used for effecting the reaction, which was conducted at room temperature, and monochlorination of such feed materials as methylcyclohexane and 2,3-dimethylbutane was disclosed. The reaction system was heterogeneous and no dichloride product was formed.

Other hydrogen-halogen exchange reactions between tertiary butyl chloride and various hydrocarbons using aluminum trichloride as catalyst have been described in the following United States patents:

| Patentee | Patent No. | Issue date |
|---|---|---|
| Schmerling | 2,448,156 | Aug. 31, 1948. |
| Condon | 2,629,748 | Feb. 24, 1953. |
| Condon | 2,646,453 | July 21, 1953. |
| Schneider et al | 2,742,507 | Apr. 17, 1956. |
| Gerzon | 3,096,372 | July 2, 1963. |
| Mahan et al | 3,230,269 | Jan. 18, 1966. |
| Kruse et al | 3,247,277 | Apr. 18, 1966. |

The reaction conditions taught in these references generally are such that the reaction system is heterogeneous, comprising a hydrocarbon phase and a catalyst phase. None of these references teaches the halogenation of polycyclic perhydroaromatics having 3 or more rings by means of a hydrogen-halogen interchange reaction.

SUMMARY OF THE INVENTION

The present invention provides a process for utilizing the hydrogen-halogen interchange reaction to convert certain types of perhydroaromatics having 3 or more rings into monohalo and dihalo derivatives. The starting hydrocarbons have the following characteristics: (1) they are polycyclic perhydroaromatics with 3–11 rings at least two of which are fused; (2) they are free of any 5-membered ring which has 3 or more fused carbon atoms; and (3) they have 0–6 alkyl substituents, which are methyl, ethyl or n-propyl or any combination thereof, located on the rings at positions other than ring junctions. The procedure involves a hydrogen-halogen interchange reaction between one or more of such perhydroaromatics and a $C_4$–$C_5$ tertiary alkyl chloride or bromide, promoted by means of $AlCl_3$ or $AlBr_3$ in solution. The reaction is carried out at a relatively low temperature, viz in the range of −30° C. to 20° C., and conditions are such that a homogeneous reaction mixture is maintained.

I have now found that such polycyclic, fused ring perhydroaromatics can be effectively mono- and dihalogenated by utilizing a substantially homogeneous reaction system in which the aluminum trihalide catalyst is maintained in solution in the reactant mixture throughout the hydrogen-halogen exchange reaction.

The process of the invention comprises the following steps:

(a) Forming a solution of (1) a perhydroaromatic hydrocarbon having 3–11 rings at least two of which are fused and none of which is a 5-membered ring with 3 or more fused carbon atoms, and having 0–6 unbranched alkyl substituents containing 1–3 carbon atoms each located on the rings at positions other than ring junctions, and (2) a $C_4$–$C_5$ tertiary alkyl halide in which the halogen is chlorine or bromine in molar ratio to said hydrocarbon of at least 1:1, said solution being capable of dissolving and maintaining therein the aluminum trihalide hereinafter specified;

(b) Maintaining said solution at a temperature in the range of −30° C. to 20° C. while admixing therewith and dissolving therein an aluminum trihalide in which the halogen is the same as that in the tertiary halide, the weight ratio of aluminum trihalide to the tertiary halide being sufficient to promote mono- and dihalogenation of said perhydroaromatic;

(c) Maintaining the resulting solution within said temperature range and in homogeneous phase until at least substantial mono- and dihalogenation of the alkylcyclohexane has occurred;

(d) And recovering from the reaction mixture mono- and dihalogenated perhydroaromatic product in which the halogen atoms are attached to ring carbon atoms.

DESCRIPTION

As a specific illustration of the process, 10 parts (by weight) of perhydroanthracene are dissolved in 100 parts of tertiary butyl bromide, the solution is cooled to −5° C. and 3 parts of $AlBr_3$ powder are mixed into and dissolved in the solution. The mixture is stirred at −5° C. for 30 minutes, during which time isobutane is formed and partly evolves. Then $AlBr_3$ in amount of 3 parts again is added and mixing is continued at −5° C. for 30 minutes more. The mixture remains essentially homogeneous, no separate catalyst complex phase being formed. The mixture is then washed with water to remove the inorganic material and fractionally distilled. A monobromo perhydroanthracene fraction and a dibromo perhydroanthracene fraction are separately recovered, these being substantially the only products of the reaction.

As a further specific illustration, 10 parts (by weight) of 2,7-dimethylperhydropyrene, which is a $C_{18}$ naphthene with four condensed rings, are dissolved in a mixture of 40 parts of t-butyl chloride and 40 parts of methylene chloride, the solution is agitated at about 0° C., 1 part of $AlCl_3$ powder is dissolved therein and mixing is continued for ten minutes. After this, $AlCl_3$ is added twice again each time in the same amount as before, and the mixture is agitated for 10 minutes at 0° C. after each addition. All of the catalyst goes into and remains in solution during the reaction. Water washing followed by fractional distillation of the reaction mixture yields monochloro and dichloro dimethylperhydropyrene fractions as products. Each fraction is composed of a mixture of isomers. In the monochloro fraction the favored isomer has its chlorine atom attached to the same ring carbon atom to which one of the methyl groups is attached (2-position), and the favored isomer in the dichloro fraction has both chlorine atoms attached respectively to the two carbon atoms on which the methyl groups are substituted (2- and 7-positions). In this illustration the methylene chloride does not enter into the reaction, serving merely as an inert solvent.

The halogenating agent for practicing the invention must be a $C_4$ or $C_5$ tertiary alkyl chloride or bromide or, in other words, t-butyl or t-amyl chloride or bromide. Primary or secondary halides are not suitable, for these will not react in the manner desired. Also it is essential for purposes of the present invention that a low reaction temperature, i.e., in the range of −30° C. to 20° C., be used, since at higher temperatures cracking reactions will occur causing sludge to precipitate and the halogenation will not proceed as desired. Preferably a reaction temperature in the range of −10° C. to 10° C. is employed.

It is also important in the present process that the reaction mixture comprising the polycyclic perhydroaromatic and the $C_4$–$C_5$ tertiary alkyl halide be capable of dissolving and maintaining in solution therein all of the $AlCl_3$ or $AlBr_3$ added. In other words, conditions must be such as to maintain substantially the entire reaction mixture as a single phase and avoid the formation of a separate catalyst complex phase. The preferred way of establishing and maintaining a homogeneous system is to utilize a considerable excess of the tertiary alkyl halide over the stoichiometric amount required for the desired degree of halogenation. When the $AlCl_3$ or $AlBr_3$ is added to the mixture, it reacts with the tertiary alkyl halide to form a complex and this complex must remain at least mainly in solution. The precise function of the complex is not known with certainty and it may be that at least part of it acts as the catalytic species. However, it is considered more probable that dissolved $AlCl_3$ or $AlBr_3$ is the catalytic agent and that, at least in the case of $AlCl_3$, the complex formed is necessary for bringing the $AlCl_3$ into solution. In any event, sufficient excess tertiary alkyl halide should be present to act as solvent for this catalyst complex and keep it in solution. Otherwise, if a homogeneous reaction mixture is not maintained and the catalyst complex forms a separate phase, the hydrogen-halogen transfer reaction will not proceed efficiently and especially will be dihalogenation reaction not proceed as desired.

For example, when a polymethylperhydroanthracene is to be reacted with t-butyl chloride without the aid of an inert solvent with the objective of obtaining a good yield of dichloro product, a substantial excess of t-butyl chloride over the stoichiometric 2:1 molar ratio should be used so that the aluminum chloride complex will remain in solution. Typically a molar ratio of t-butyl chloride to polymethylperhydroanthracene above 3:1, e.g., in the range of 4:1 to 25:1, can be employed to maintain a homogeneous solution. For dichlorination or dibromination of other starting hydrocarbons as herein defined, analogous ratios of reactants are employed. In all cases the presence of t-butyl chloride in substantial excess tends to inhibit isomerization of the feed material.

Another manner of practicing the inveniton to maintain homogeneity of the reaction mixture is to employ the $C_4$–$C_5$ tertiray alkyl halide in a lower proportion, and additionally to use an inert halogenated solvent to keep in solution the complex formed between the tertiary alkyl halide and $AlCl_3$ or $AlBr_3$. In such case the tertiary alkyl halide can be used in a molar ratio of 2:1 or even as low as 1:1, as long as sufficient inert solvent is employed. Certain halogenated hydrocarbons are inert under conditions used in the process and will not themselves react with the aluminum trihalide to form a complex. These can be used as solvent to maintain the reaction mixture in homogeneous phase. Halogenated hydrocarbons which are suitable for this purpose include the following: methylene chloride; 1,1,2,2-tetrachloroethane; pentachloroethane; and the bromine homologues of each of the foregoing solvents. This manner of practicing the invention is not, however, generally preferred since it requires an additional component in the reaction system, and it is usually preferable merely to use an excess of the $C_4$–$C_5$ tertiary alkyl halide as solvent and thus dispense with the need for an inert halogenated solvent.

The hydrocarbon feed can be one or more polycyclic perhydroaromatics with two or more fused rings and three to eleven total rings inclusive. However the feed hydrocarbon should not contain any 5-membered ring which has three or more carbon atoms fused with one or more other rings, such as, for example, in the case of perhydrofluorene or perhydroacenaphthene, as this configuration would permit the hydrocarbon to react with the aluminum trihalide to form a Deno-type complex [see JACS, 84, 1498–9 (1962) and JACS, 85, 2991–5 (1963)] and the desired halogenation reaction would not take place. The perhydroaromatic feed can contain no alkyl substituents or can have one to six, inclusive, unbranched alkyl groups of the $C_1$–$C_3$ range. In other words, these substituents can be methyl, ethyl or n-propyl, or any combination of these alkyl groups. However, the alkyl substituents should be located at positions other than ring junctions. Gem substitution of the alkyl groups on rings is permissible. Any perhydroaromatic as here defined can be mono- and dichlorinated or mono- and dibrominated in the present process. The halogen atoms in the products can appear as both secondary and tertiary carbon atoms, with tertiary positions other than ring junctions tending to be favored. In the case of alkyl-substituted perhydroaromatics, positions of the alkyl groups in the product will not necessarily be the same as in the starting hydrocarbon, depending upon whether the reaction conditions favor isomerization during the halogenation reaction. The use of a large excess of the t-alkyl halide tends to suppress isomerization of the alkyl substituents as well as ring isomerization for both the hydrocarbons and halo derivatives.

Polycyclic perhydroaromatics suitable for use as feed in the present process are obtainable by complete hydrogenation of corresponding polycyclic, fused ring aromatic hydrocarbons. Numerous examples of such polycyclic aromatics are listed in Section 5 of a catalogue of Rütgerswerke-Aktiengesellschaft-6 Frankfurt am Main, Mainzer Landstrasse 195–217, and in Section A4, Table 4, of "The Coal Tar Data Book" (1953), by The Coal Tar Research Association, Nr. Leeds, England. These aromatics can be converted to perhydroaromatics by complete hydrogenation in known manner, for example, by treatment at 350–400° C. with hydrogen at a partial pressure of 2000–5000 p.s.i. in the presence of a tungsten sulfide hydrogenation catalyst.

Polycyclic aromatics suitable for preparing perhydroaromatic feed materials for the present process are referred to in the following U.S. patents: Schneider 3,128,316, dated Apr. 7, 1964; Schneider 3,303,227, dated Feb. 7, 1967; and Vanderwerff 3,481,997, dated Dec. 2, 1969.

Perhydroaromatic feed hydrocarbons which have methyl, ethyl or n-propyl substituents can be obtained by alkylating any of the available polycyclic aromatics referred to above in known manner by means of methyl, ethyl or n-propyl chloride, or the corresponding alcohols, and then completely hydrogenating the alkylation product. Feedstocks containing mixed alkyl substituents can be obtained by alkylating these aromatics with a mixture of alkylating agents containing any combination of methyl, ethyl and n-propyl groups.

The following are some examples of aromatic hydrocarbon ring structures with 3–11 rings which can be fully hydrogenated to yield perhydroaromatics suitable for use in the present process. It is to be understood that in the perhydro products derived from these any alkyl substituents therein, aside from not being at the ring junction positions, can be located at any of the other rings and that specific positions of substitution are not important for operability of the process.

Polycyclic aromatic ring structures, with number of rings indicated parenthetically: anthracene (3); phenanthrene (3); 1- or 2-phenylnaphthalene (3); hydrindacene (3); 1,2- or 2,3-cyclopentanonaphthalene (3); phenalene (3); pyrene (4); chrysene (4); naphthacene (4); 1,2-benzanthracene (4); triphenylene (4); 2,6- or 2,7-diphenylnaphthalene (4); 1,2- or 4,5-benzpyrene (5); perylene (5); 1,2-benznaphthacene (5); 3,4-benztetraphene (5); picene (5); 1,12-benzperylene (6); 3,4,8,9-dibenztetraphene (6); 1,2-benzpentacene (6); coronene (7); 1,2,8,9-dibenzpentacene (7); 1,2-benz(naphtho-2′,3′,4,5)-pyrene (7); 1,2-benzocoronene (8); diphenylcoronenes (9); ovalene (10); quaterylene (11); and the like. Any of these structures also containing 1–6 alkyl substituents which are methyl, ethyl or n-propyl can be perhydrogenated to yield feed material for the present process.

The equation given below illustrates the reaction, starting, for example, with t-butyl chloride and 2,7-dimethylperhydropyrene. The preparation of and numbering system for this condensed ring tetracyclic naphthene are shown in aforesaid Schneider U.S. Pat. 3,303,227, dated Feb. 7, 1967. In the equation most hydrogen atoms are omitted for convenience.

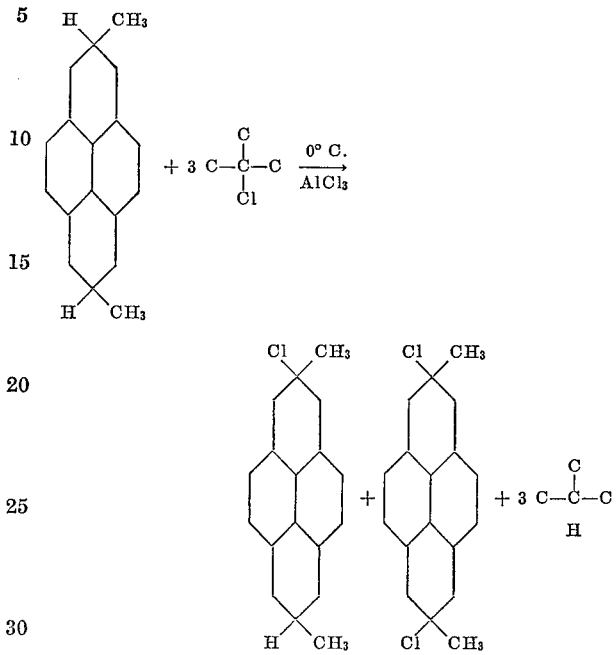

Aside from isobutane, the products of the reaction, as shown, are the monochloro derivative, 2-chloro-2,7-dimethylperhydropyrene, and the dichloro derivative, 2,7-dichloro-2,7-dimethylperhydropyrene. These are favored kinetically and thermodynamically and will be the monochloro and dichloro isomers, respectively, that are produced in largest amounts. However smaller amounts of isomeric monochloro and dichloro products generally also will be formed, including isomers resulting from shifting of positions of chlorine atoms as well as methyl groups.

In the foregoing equation the positions of the methyl groups in the favored mono and dihalo products are the same as in the starting perhydroaromatic but this would not necessarily be the case for other alkyl-substituted perhydroaromatic hydrocarbons. Considerable shifting of positions of the alkyl groups on the rings can occur depending upon how much t-butyl chloride is present and how much aluminum trihalide is used in conducting the reaction. The tendency is for the kinetic monochloro and dichloro products first obtained to isomerize to equilibrium mixtures of their isomers if enough $AlCl_3$ is added to the reaction mixture, and this involves shifting of the alkyl groups as well as the chlorine atoms. These isomerization reactions can be suppressed by increasing the amount of t-alkyl halide used in the reaction mixture.

A preferred way of carrying out the invention utilizing an excess of tertiary alkyl halide as solvent is given in the following description using t-butyl chloride as the tertiary halide and $AlCl_3$ as catalyst. The starting perhydroaromatic is dissolved in the t-butyl chloride, using, for example, between 5 and 25 moles of t-butyl chloride per mole of the perhydroaromatic; and the mixture is cooled to 0° C. While the mixture is being well agitated, $AlCl_3$ is added thereto in amount usually between 1.5 and 20 parts by weight per hundred parts of t-butyl chloride. In some cases it may be advantageous to add the $AlCl_3$ in incremental amounts throughout a time of 10–60 minutes in order to more easily control reaction conditions such as temperature and rate of gas evolution. However, if control of the reaction presents no problem, substantially the same results can be obtained by adding all of the required amount of $AlCl_3$ at once.

When an amount of $AlCl_3$ is added, it goes into solution and forms with the t-butyl chloride a complex which remains in solution. As previously mentioned, the complex formed may act as solvent for uncomplexed $AlCl_3$ which, when brought into solution, functions as the catalytic agent. This promotes the hydrogen-chlorine exchange reaction. Also a slow evolution of HCl generally occurs indicating some side reaction, and the catalyst activity concurrently delines until the reaction ceases. Addition of a further amount of $AlCl_3$ will then result in more solubilized catalyst and further promote the hydrogen-chlorine exchange reaction until the catalyst activity again diminishes. The procedure of adding incremental amounts of $AlCl_3$ can be continued to promote the exchange reaction until the desired degree of chlorination has been reached. Alternatively, all of the $AlCl_3$ needed can be added at the beginning provided that the reaction does not proceed so fast as to get out of control. Removal of isobutane from the system as it is formed will expedite the hydrogen-halogen exchange reaction.

The amount of $AlCl_3$ or $AlBr_3$ that should be used depends mainly upon the amount of tertiary alkyl halide in the mixture, the reaction temperature selected within the specified range of $-30°$ C. to $20°$ C., and the degree of halogenation desired. The higher the reaction temperature the greater is the tendency of the $AlCl_3$ or $AlBr_3$ to be consumed in side reactions and the more that will be required. Preferably, the weight proportion of total aluminum trihalide to tertiary alkyl halide should be in excess of 1.5:100 and sufficiently in excess of this ratio to maximize yield of the desired halogenation product. Side reactions can be inhibited by maintaining a pressure of hydrogen chloride in the reaction system, e.g. by maintaining a partial pressure of HCl in the range of 50–100 p.s.i.

When the reaction has been completed, the mixture can be washed with water to remove the catalyst residues and then the mono- and dihalogenated products can be separated from other reaction mixture components and from each other in any suitable manner, for example, by fractional crystallization and/or distillation.

The mono- and dihalo perhydroaromatic products can be used to alkylate benzenoid hydrocarbons, such as benzene, toluene or xylenes, and yield polycyclic hydrocarbons of low aromaticity. This alkylation reaction can readily be effected by admixing the halogenated product with the benzenoid hydrocarbon and $AlCl_3$ or $AlBr_3$ at room temperature thereby causing HCl or HBr to split out and result in replacement of each halogen atom by an aryl group. The resulting alkylate will contain 1–2 benzenoid rings, with the other rings being saturated. This material is useful as a component of fluids for traction drive systems for the transmission of power, as described, for example, in the following United States patents: Rounds 3,394,603, dated July 30, 1968; Hamman et al. 3,411,369, dated Nov. 19, 1968; and Hamman et al. 3,440,894, dated Apr. 29, 1969. Alkylate products made in this manner also have utility as feedstock for the preparation of sulfonate detergents useful in lubricating oil compositions, since the aromatic rings therein are readily sulfonatable in know manner, e.g. by means of 100% $H_2SO_4$. The sulfonate product is of relatively low aromaticity, a majority of the rings therein being saturated, and the preponderance of saturated rings imparts improved oil solubility, as compared with the oil solubility characteristics of sulfonates made from highly aromatic hydrocarbons.

The following examples are specific illustrations of the invention. In the table accompanying the examples the total amount of $AlCl_3$ that has been used up to the time of each sampling is indicated in terms of g. $AlCl_3$ per 100 g. of t-butyl chloride employed.

Example I

This example illustrates the reaction of perhydrophenanthrene (herein "PHPN") with t-butyl chloride, using a relatively low mole ratio of the latter to the PHPN, viz about 1.7. A solution of 1.00 g. (0.0052 mole) of PHPN, 0.82 g. (0.0088 mole) of t-butyl chloride and 4.0 ml. of methylene chloride was stirred at $0°$ C. and 0.10 g. of $AlCl_3$ powder was added. The $AlCl_3$ dissolved and the solution became yellow. The mixture was stirred at $0°$ C. for 30 minutes during which time it remained homogeneous. The mixture then was diluted with pentane, whereupon a small amount of catalyst complex precipitated. The hydrocarbon layer was decanted, water washed and dried with potassium carbonate, and the pentane was then evaporated. The resulting product was analyzed by GLC. Results are shown in the accompanying table and are given in weight percent on a t-butyl chloride-free and methylene chloride-free basis.

Example II

Another run was made in generally the same way as Example I again using t-butyl chloride with PHPN as the starting hydrocarbon, but in this case the mole ratio of t-butyl chloride to PHPN was increased to 5.6. Specifically, a mixture of 1.00 g. (0.0052 mole) of PHPN, 2.68 g. (0.029 mole) of t-butyl chloride and 4.0 ml. of methylene chloride was prepared and cooled to $0°$ C. $AlCl_3$ powder in an amount of about 0.03 g. was added and the resulting yellow solution was stirred at about $0°$ C. for 10 minutes. A one ml. sample (Cut 1) was taken at this time for purpose of analysis. To the remainder, about 0.03 g. of $AlCl_3$ was added and stirring of the resulting solution at $0°$ C. was continued for 10 minutes more, following which another sample (Cut 2) was taken. Each sample was diluted with pentane to precipitate catalyst complex, and the hydrocarbon layer was water washed and dried. After evaporation of the pentane, each sample was analyzed by GLC, giving the results shown in the table.

Example III

Another run was made with the same reactants and in generally the same manner as Example II, except that larger proportions of $AlCl_3$ and longer reaction times were employed. Specifically, the reaction mixture was composed of 1.05 g. (0.0055 mole) of PHPN, 2.58 g. (0.0278 mole) of t-butyl chloride and 4.0 ml. of methylene chloride. Two additions of $AlCl_3$ in amounts of about 0.1 g. each were made, and reaction times were as shown in the table. Again the reaction mixture was substantially homogeneous throughout the reaction.

TABLE

[Reaction of Perhydrophenanthrene (PHPN)]

| Example Number | I | II | | III | |
|---|---|---|---|---|---|
| Mole ratio of t-butyl Cl/PHPN | 1.7 | 5.6 | | 5.1 | |
| Cut Number | 1 | 1 | 2 | 1 | 2 |
| Total reaction time, min | 30 | 10 | 20 | 74 | 95 |
| Grams $AlCl_3$/100 g. t-butyl chloride | 12.2 | 1.1 | 2.4 | 7.8 | 12.2 |
| Product composition, wt. percent: | | | | | |
| PHPN | 6.9 | 61.2 | 21.3 | 14.1 | 12.7 |
| Unknown | | | 2.8 | | |
| PHPN monochlorides | 32.2 | 36.2 | 62.0 | 43.9 | 39.1 |
| PHPN dichlorides | 3.9 | 2.6 | 13.9 | 42.0 | 48.2 |

NOTE.—Halogenating agent: t-butyl chloride. Reaction temperature: about $0°$ C.

The results presented in the table for the three runs show that good yields of both monochloro and dichloro products can be obtained from PHPN by operating with a homogeneous reaction system in accordance with the invention. A comparison of Example I, in which a relatively low proportion (1.7) of t-butyl chloride to perhydroaromatic feed was employed, with Examples II and III shows that the use of molar proportions of these reactants considerably above 2:1 helps to maximize the yields of either the monochloro or dichloro derivatives or both.

Also a comparison of the data for the various cuts of Examples II and III indicates that there is an optimum proportion of $AlCl_3$ to t-butyl chloride to use corresponding to a maximum yield of monochloro products for any particular reaction mixture. In the present instance this optimum for monochloro production is indicated to coincide about with the $AlCl_3$:t-butyl chloride proportion of Cut 2 in Example II. Similarly another optimum in this proportion will occur, for any given reaction mixture in order to maximize the yield of dichloro products.

The substitution of perhydroanthracene for PHPN in the foregoing examples gives substantially equivalent results. Analogous results are also obtained when other polycyclic, fused ring perhydroaromatics as herein specified are substituted for the starting perhydroaromatic used in the foregoing examples. As a general rule, an increase in the number of alkyl substituents on the rings tends to make the chlorination and particularly dichlorination take place more readily. Likewise essentially equivalent results are obtained when tertiary butyl bromide with $AlBr_3$ as catalyst is used in place of the tertiary chloride. The halogenation reaction also proceeds in essentially the same manner when tertiary amyl chlorides or bromides are used, but in such cases more side reactions tend to occur.

The invention claimed is:

1. Process of preparing mono- and dihalogenated polycyclic, fused ring perhydroaromatics which comprises:
   (a) forming a solution of (1) a perhydroaromatic hydrocarbon having 3-11 rings at least two of which are fused and none of which is a 5-membered ring with 3 or more fused carbon atoms, and having 0-6 unbranched alkyl substituents containing 1-3 carbon atoms each located on the rings at positions other than ring junctions, and (2) a $C_4$-$C_5$ tertiary alkyl halide in which the halogen is chlorine or bromine in molar ratio to said perhydroaromatic of at least 1:1, said solution being capable of dissolving and maintaining therein the aluminum trihalide hereinafter specified;
   (b) maintaining said solution at a temperature in the range of $-30°$ C. to $20°$ C. while admixing therewith and completely dissolving therein so as to form a homogeneous solution an aluminum trihalide in which the halogen is the same as that in said tertiary halide, the weight ratio of aluminum trihalide to the tertiary halide being sufficient to promote mono- and dihalogenation of said perhydroaromatic;
   (c) maintaining the resulting solution within said temperature range and in homogeneous phase until at least substantial mono- and dihalogenation of said perhydroaromatic has occurred;
   (d) and recovering from the reaction mixture mono- and dihalogenated perhydroaromatic product in which the halogen atoms are attached to ring carbon atoms.

2. Process according to claim 1 wherein said $C_4$-$C_5$ tertiary alkyl halide is tertiary butyl chloride or bromide.

3. Process according to claim 2 wherein said temperature is in the range of $-10°$ C. to $10°$ C.

4. Process according to claim 3 wherein said weight ratio of aluminum trihalide to the tertiary butyl halide is above 1.5:100.

5. Process according to claim 2 wherein said molar ratio of tertiary alkyl halide to perhydroaromatic is in excess of 2:1.

6. Process according to claim 5 wherein the starting perhydroaromatic contains at least three fused rings.

7. Process according to claim 6 wherein said $C_4$-$C_5$ tertiary alkyl halide is tertiary butyl chloride or bromide, and said weight ratio of aluminum trihalide to the tertiary butyl halide is above 1.5:100.

8. Process according to claim 7 wherein said temperature is in the range of $-10°$ C. to $10°$ C. and the halogen in the tertiary butyl halide and in the aluminum trihalide is chlorine.

9. Process according to claim 8 wherein the starting perhydroaromatic is perhydrophenanthrene or perhydroanthracene.

10. Process according to claim 1 wherein said temperature in the range of $-10°$ C. to $10°$ C. and said weight ratio of aluminum trihalide to the tertiary alkyl halide is above 1.5:100.

11. Process according to claim 10 wherein the tertiary halide is tertiary butyl bromide and the aluminum trihalide is $AlBr_3$.

12. Process according to claim 10 wherein the tertiary halide is tertiary butyl chloride and the aluminum trihalide is $AlCl_3$.

References Cited

UNITED STATES PATENTS 3,096,372   7/1963   Gerzon _____ 424—321
3,485,880   12/1969  Schneider _____ 260—648 R

OTHER REFERENCES

Foster: Inorganic Chemistry for Colleges, 2nd edition (1936), p. 279.

DANIEL D. HORWITZ, Primary Examiner